United States Patent
Huang et al.

(10) Patent No.: US 12,528,237 B2
(45) Date of Patent: Jan. 20, 2026

(54) FOAMABLE CROSS-LINKABLE THERMOPLASTIC MATERIAL, CONNECTOR AND MANUFACTURING METHOD THEREOF

(71) Applicant: Tyco Electronics (Shanghai) Co. Ltd., Shanghai (CN)

(72) Inventors: Zhongxi Huang, Shanghai (CN); Jiankun (Jerry) Zhou, Middletown, PA (US)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 97 days.

(21) Appl. No.: 17/890,355

(22) Filed: Aug. 18, 2022

(65) Prior Publication Data

US 2023/0059621 A1 Feb. 23, 2023

(30) Foreign Application Priority Data

Aug. 18, 2021 (CN) .......................... 202110949256.7

(51) Int. Cl.
  *B29C 45/14* (2006.01)
  *B29C 45/72* (2006.01)
  (Continued)

(52) U.S. Cl.
  CPC .. *B29C 45/14786* (2013.01); *B29C 45/14008* (2013.01); *B29C 45/7207* (2013.01);
  (Continued)

(58) Field of Classification Search
  CPC ...... B29C 2791/002; B29C 2945/7604; B29C 2945/76381; B29C 45/0001;
  (Continued)

(56) References Cited

U.S. PATENT DOCUMENTS 5,605,937 A * 2/1997 Knaus .................... B29C 48/05
  521/184
10,530,071 B2  1/2020  Schmidt et al.
(Continued)

FOREIGN PATENT DOCUMENTS

CN    102690459 A    9/2012
CN    103951866 A    7/2014
(Continued)

OTHER PUBLICATIONS

Translation of KR-100408704, Dec. 6, 2003. (Year: 2003).*
(Continued)

*Primary Examiner* — Hai Vo
(74) *Attorney, Agent, or Firm* — Barley Snyder

(57) ABSTRACT

A foamable cross-linkable thermoplastic material comprises a matrix polymer of any one or a mixture of two or more of polyethylene (PE), ethylene vinyl acetate copolymer (EVA) and polypropylene (PP), a cross-linking agent, and a foaming agent. A weight ratio of the cross-linking agent to the matrix polymer is 1-5:100. A weight ratio of the foaming agent to the matrix polymer is 1-5:100. A cross-linking foaming temperature of the thermoplastic material is equal to or higher than the melting point of the matrix polymer.

7 Claims, 1 Drawing Sheet blending granulation

(51) Int. Cl.
*B29K 23/00* (2006.01)
*B29K 105/00* (2006.01)
*B29K 105/04* (2006.01)
*C08J 9/00* (2006.01)
*C08J 9/06* (2006.01)
*C08J 9/16* (2006.01)
*C08L 23/0853* (2025.01)
*C08L 23/12* (2006.01)

(52) U.S. Cl.
CPC ............... *C08J 9/0061* (2013.01); *C08J 9/06* (2013.01); *C08J 9/16* (2013.01); *C08L 23/0853* (2013.01); *C08L 23/12* (2013.01); *B29C 2791/002* (2013.01); *B29C 2945/7604* (2013.01); *B29C 2945/76381* (2013.01); *B29K 2023/0633* (2013.01); *B29K 2023/083* (2013.01); *B29K 2023/12* (2013.01); *B29K 2105/0088* (2013.01); *B29K 2105/04* (2013.01); *B29K 2105/251* (2013.01); *C08J 2201/026* (2013.01); *C08J 2203/02* (2013.01); *C08J 2203/04* (2013.01); *C08J 2323/08* (2013.01); *C08J 2323/12* (2013.01); *C08L 2203/30* (2013.01); *C08L 2205/02* (2013.01); *C08L 2207/066* (2013.01); *C08L 2312/00* (2013.01)

(58) Field of Classification Search
CPC ........ B29C 45/14008; B29C 45/14639; B29C 45/14786; B29C 45/7207; B29L 2031/3481; C08J 2203/02; C08J 2203/04; C08J 2323/08; C08J 2323/12; C08K 5/14; C08L 2203/30; C08L 2205/02; C08L 2207/066; C08L 23/04; C08L 23/0853; C08L 23/12; C08L 2312/00
See application file for complete search history.

(56) References Cited

U.S. PATENT DOCUMENTS

| | | | |
|---|---|---|---|
| 2004/0249009 A1 | 12/2004 | Homma et al. | |
| 2009/0172970 A1* | 7/2009 | Prieto | C08J 9/0014 428/17 |
| 2016/0331073 A1* | 11/2016 | Nakano | C08J 9/0061 |
| 2017/0204238 A1* | 7/2017 | Frick | C08J 9/10 |
| 2018/0233835 A1* | 8/2018 | Schmidt | H01R 4/70 |
| 2021/0340347 A1* | 11/2021 | Matsui | C08J 9/0061 |

FOREIGN PATENT DOCUMENTS

| | | | | |
|---|---|---|---|---|
| CN | 108140962 A | | 6/2018 | |
| CN | 110655702 A | | 1/2020 | |
| DE | 102005027019 A1 | * | 12/2006 | ............ C08J 9/0061 |
| KR | 100408704 B1 | * | 12/2003 | |
| TW | 201538539 A | * | 10/2015 | ............ A43B 13/04 |
| WO | 9943051 A1 | | 8/1999 | |

OTHER PUBLICATIONS

Translation of DE 102005027019, Karl-Christian Danz, Dec. 14, 2006. (Year: 2006).*
Translation of TW_201538539A, Nakano et al., Oct. 16, 2015. (Year: 2015).*
Chinese Office Action with Search Report dated Aug. 15, 2023 with English translation, corresponding to Application No. 202110949256.7, 16 pages.

* cited by examiner

FOAMABLE CROSS-LINKABLE THERMOPLASTIC MATERIAL, CONNECTOR AND MANUFACTURING METHOD THEREOF

CROSS-REFERENCE TO RELATED APPLICATIONS

This application claims the benefit of Chinese Patent Application No. CN 202110949256.7 filed on Aug. 18, 2021, the whole disclosure of which is incorporated herein by reference.

FIELD OF THE INVENTION

The present disclosure relates to the technical field of electronic devices, in particular to sealing materials for connector products and their applications.

BACKGROUND

Electrical connectors typically include terminals and plastic housings. The plastic housing has the functions of support, insulation and sealing. Connectors often face harsh environmental conditions when they are used, and the sealing performance of the product determines the protection ability of the product under harsh environment. The increasingly stringent sealing requirements pose a higher challenge to the sealing structure of connectors.

At present, sealing rings, glue fillings and insert injection moldings are commonly used to seal or insulate connectors. However, as the structure of connectors becomes more and more complex, the sealing requirements and difficulty for achieving the same become higher and higher. Conventional sealing rings and insert injection molding are insufficient to meet such needs, while the glue filling process is relatively complex and inconvenient to operate.

Therefore, a sealing scheme with improved sealing performance and a simpler manufacturing process is needed.

SUMMARY

According to one embodiment of the present disclosure, a foamable cross-linkable thermoplastic material comprises a matrix polymer of any one or a mixture of two or more of polyethylene (PE), ethylene vinyl acetate copolymer (EVA) and polypropylene (PP), a cross-linking agent, and a foaming agent. A weight ratio of the cross-linking agent to the matrix polymer is 1-5:100. A weight ratio of the foaming agent to the matrix polymer is 1-5:100. A cross-linking foaming temperature of the thermoplastic material is equal to or higher than the melting point of the matrix polymer.

BRIEF DESCRIPTION OF THE DRAWINGS

The invention will now be described by way of example with reference to the accompanying Figures, of which.

DETAILED DESCRIPTION OF THE EMBODIMENTS

Figure 1:
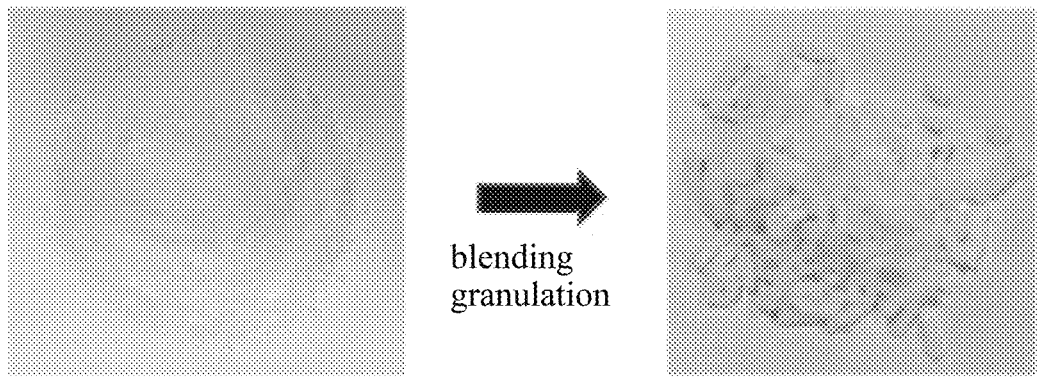
FIG. 1 is a photo of the foamable and cross-linkable thermoplastic material in embodiment 1 of the present disclosure before and after blending and granulation.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Unless otherwise specified, all figures used in the description and claims to indicate feature size, quantity and physical characteristics shall be understood as being modified by the term "about" in all cases. Therefore, unless there is an explanation to the contrary, the numerical parameters listed in the description and the appended claims are approximate values, and those skilled in the art can appropriately change these approximate values by using the required characteristics sought by the teaching content disclosed herein. The use of a range of values represented by endpoints includes all the numbers within the range and any range within the range, for example, 1 to 5 include 1, 1.1, 1.3, 1.5, 2, 2.5, 2.75, 3, 3.5, 3.80, 4, 5, and so on.

1. Foamable Cross-Linkable Thermoplastic Material and its Preparation Method

The following describes various components of the foamable cross-linkable thermoplastic material of the present disclosure.

(1) Matrix Polymer

In the present disclosure, a matrix polymer of the foamable cross-linkable thermoplastic material is selected from the foamable material with low melting point. In general, the melting point of the matrix polymer is lower than the foaming and cross-linking temperature. In this way, a preformed piece of the material can be manufactured without foaming and cross-linking. For example, the melting point of the matrix polymer may be below 170° C., 160° C., 150° C., 140° C., 130° C., or 120° C.

The matrix polymer with low melting point can be selected from any one or two or more mixtures of polyethylene (PE), ethylene vinyl acetate copolymer (EVA) and polypropylene (PP). Among them, PE can be low density polyethylene (LDPE) or ultra-low density polyethylene (ULDPE). In some embodiments, a mixture of the two materials may be used as the matrix polymer. At least one, preferably both, of the two materials is a low melting point material. For example, a mixture of PE and EVA can be used as the matrix polymer, and the mixing ratio (weight ratio) of the two can be 1:9 to 9:1.

(2) Cross-Linking Agent

In the present disclosure, a cross-linking agent whose cross-linking temperature is equal to or higher than the melting point of the matrix polymer is desired. The type of cross-linking agent can be selected according to the matrix polymer, which can be of the free radical initiator type, the olefin bonded cross-linking agent type, etc. For PE, EVA, PP and other matrix polymers, peroxide cross-linkers and allyl cross-linkers can be selected, such as di cumyl peroxide (DCP) and tri allylisocyanurate (TAIC). The ratio of cross-linking agent to matrix polymer can be appropriately selected, for example, the weight ratio is 1-5:100, or 2-4:100.

(3) Foaming Agent

In the present disclosure, a foaming agent is a compound that foams a matrix polymer, for example, in a molten state. In order to facilitate the pre molding of the matrix polymer without foaming, the foaming temperature of the foaming agent is generally higher than the melting point of the matrix polymer. The foaming agent of the present disclosure can be a chemical foaming agent, which decomposes at high temperature to produce gas and forms fine pores in polymer components. Chemical foaming agents with high decomposition temperature are suitable. For example, sodium bicarbonate foaming agents or azo foaming agents (such as azoformamide), semicarbazide foaming agents, nitroso compounds, etc. can be selected. The specific type of foaming agent can be appropriately selected according to the matrix polymer used, so as to obtain materials foaming above 170° C., 180° C. or 190° C. The ratio of foaming agent to matrix polymer can be properly selected. From the point of view of achieving full foaming without significantly affecting the preformed piece of matrix polymer, the weight ratio of foaming agent to matrix polymer can be 1-5:100, or 2-4:100.

(4) Preparation of Foamable and Cross-Linkable Thermoplastic Materials

The foamable cross-linkable thermoplastic material of the present disclosure can be obtained by mixing various components with each other. In order to make the components mixed uniformly and convenient for transportation and storage, the foamable cross-linkable thermoplastic material can be made into particles, that is, the particles can be formed by mixing and granulating the components. The blending granulation is carried out at a temperature lower than the cross-linking foaming temperature of the thermoplastic material, for example, at 120-130° C.

2. Preformed Pieces and their Preparation Methods

A significant advantage of the foamable and cross-linkable thermoplastic material of the present disclosure is that it can be preformed into a desired shape according to its specific application. At the time of formation, neither the cross-linking agent nor the foaming agent reacts. Then, after filling or adapting to a specific application position/area, it is foamed and cross-linked through high-temperature treatment, so as to improve both the sealing and filling performance and the adhesion. Therefore, the foamable cross-linkable thermoplastic material of the present disclosure can be preformed to form a preformed piece. For example, a preformed piece with a specific predetermined shape is formed by injection molding or extrusion of the thermoplastic material, in which the cross-linking agent and foaming agent are inactive (i.e., the thermoplastic material does not have observable foaming cross-linking). Depending on the application, the preformed piece may have various shapes. For example, for a seal used in a connector product, the preformed piece may be in the form of a sealing ring, a sealing tube, or a sealing sheet.

3. Connector and its Preparation Method

The present disclosure also relates to the application of foamable cross-linkable thermoplastic materials and preformed pieces, in particular to the application in connector sealing. Therefore, the present disclosure also provides a connector, the connector includes an area or gap to be sealed, and the area or gap is filled by the foamable cross-linkable thermoplastic material of the present disclosure or its in-situ cross-linked and foamed product. The connector of the present disclosure includes a terminal, a plastic housing, and a seal for sealing, wherein the seal is formed by in-situ cross-linking and foaming of a foamable cross-linkable thermoplastic material or a preformed piece of the present disclosure.

As a method of manufacturing the connector of the present disclosure, one of the following two schemes can be adopted.

Scheme 1 comprises: in the assembly process of the connector, the foamable cross-linkable thermoplastic material or preformed piece of the present disclosure is placed in the area of the connector that needs to be sealed. After the assembly is completed, heat treatment is performed to melt the thermoplastic material or preformed piece, and then the thermoplastic material or preformed piece is cross-linked and foamed to fill the gap in the sealing area. In the above embodiment, the temperature of the heating treatment may exceed 170° C. (e.g., 180° C.-240° C.), and the time may be 1-10 minutes.

Scheme 2 comprises: injection molding the foamable and cross-linkable thermoplastic material (such as particle shape) of the present disclosure onto the terminal surface to form a bonding layer. The terminal with the bonding layer is placed in the mold for injection molding of the plastic connector housing, and the bonding layer is foamed and cross-linked at the same time of injection molding of the connector housing. Optionally, post heat treatment is performed after injection molding to further cross-link and foam the bonding layer. In the above embodiment, the injection molding of the thermoplastic material can be the insert injection molding at no more than 150° C.

When the connector plastic housing is formed by secondary injection molding, the plastic housing materials can be appropriately selected, such as polybutylene terephthalate (PBT), nylon 6 (PA6), nylon 66 (PA66) and thermoplastic polyurethane (TPU), so as to match the secondary injection molding temperature with the cross-linking foaming temperature of the thermoplastic material or preformed piece, which is usually higher than the cross-linking foaming temperature. For example, for PBT, the secondary injection temperature is 260° C., for PA66, the secondary injection temperature is 275° C.

According to the above specific embodiment, the foamable cross-linkable thermoplastic material or its preformed piece and connector of the present disclosure may have at least one of the following advantages:

(1) Because the bonding material formula contains both foaming agent and cross-linking agent, it can foam and fill the gap between the metal terminal and the plastic housing at high temperature, and cross-linking can occur to maintain the foaming and improve the bonding force between the bonding material and the sealing surface.

(2) The material in the present disclosure can be preformed into a sealing ring, a sealing tube, and the like. Compared with the existing conventional sealing ring without adhesion, this scheme only needs one high-temperature treatment to realize sealing and joint filling and increase the adhesion at the same time, making the sealing more reliable.

(3) The material and scheme of the disclosure can form a sealing and bonding layer between the terminal and the housing through low-pressure injection molding. Foaming and cross-linking can be realized through the high temperature of the plastic housing during injection molding, so as to improve the sealing of the insert injection molded products. The material application process of the present disclosure is simple.

(4) The material disclosed in the present disclosure will undergo foaming and cross-linking reactions at temperatures above 170° C., so it is suitable for injection molding of engineering plastics, such as PBT, PA6, PA66 and other materials.

EXAMPLES

The present disclosure is described in more detail below through embodiments, which are only exemplary and should not be understood as limiting the scope of the present disclosure.

Example 1—Preparation of Foamable Cross-Linkable Thermoplastic Material

LDPE and EVA were mixed in the proportion of 1:1 by weight to form matrix polymer. Cross-linking agent DCP and foaming agent (master batch composed of 20% $NaHCO_3$ and LDPE) were added. The weight ratios of cross-linking agent, foaming agent and matrix polymer were 2:100 and 3:100 respectively. The above mixture is blended and granulated at 120-130° C. by extruding. FIG. 1 shows a photograph of the foamable cross-linked material before and after blending granulation.

Example 2—Simulation Application Example

Figure 2:
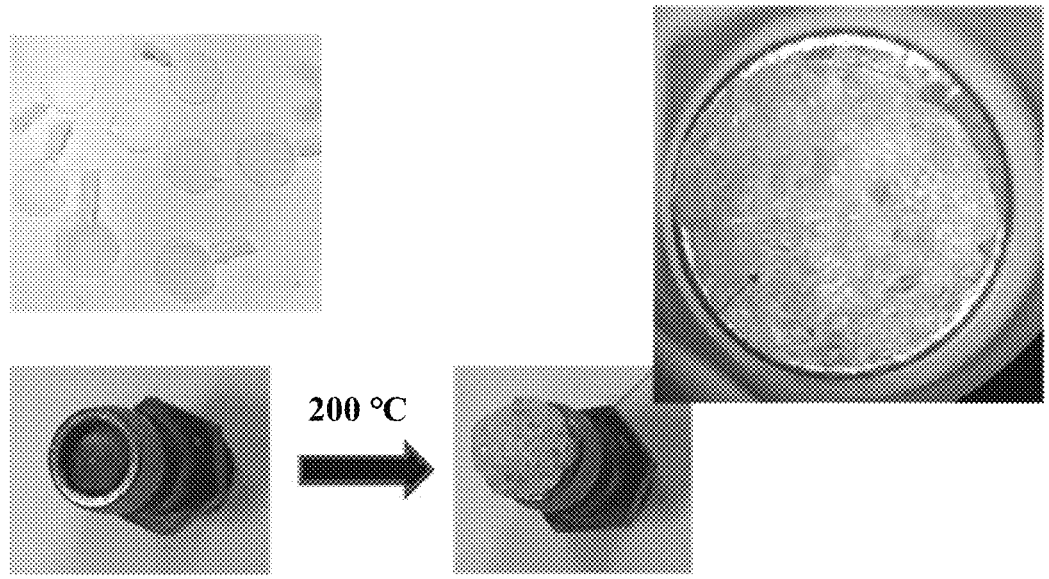
FIG. 2 shows the foamable and cross-linkable thermoplastic material in embodiment 1 of the present disclosure is foamed and cross-linked after being filled in the gap of the connector.

Take the connector terminal shown in FIG. 2, fill the gap with the particles (not fully filled) of the foamable cross-linkable thermoplastic material obtained in example 1, and then heat it to 200° C. As shown on the right side of FIG. 2, the foamable cross-linkable thermoplastic material undergoes foaming cross-linking, completely fills the gap of the connector terminal, or even expands from the gap. It can be seen from the local enlarged view on the upper side of the figure that in the initial filling state, the foamable cross-linkable thermoplastic material is still in the particle state, without foaming cross-linking (above left), but after high temperature heating, foaming cross-linking occurs. In this way, stronger bonding and sealing can be achieved.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A foamable cross-linkable thermoplastic material in the form of particles, consisting of:
    a matrix polymer of a mixture of polyethylene (PE), and ethylene vinyl acetate copolymer (EVA);
    a cross-linking agent selected from a peroxide cross-linking agent and an allyl cross-linking agent; and
    an organic foaming agent including azoformamide and foaming at a foaming temperature greater than 190° C., wherein:
    a weight ratio of the cross-linking agent to the matrix polymer is about 2:100;
    a weight ratio of the foaming agent to the matrix polymer is about 3:100;
    a cross-linking foaming temperature of the thermoplastic material is equal to or higher than the melting point of the matrix polymer;
    the particles are formed by blending and granulating the components of the thermoplastic material at a temperature lower than the cross-linking foaming temperature;
    the matrix polymer is a mixture of PE and EVA, and a mixing ratio of the PE and EVA is about 1:1 by weight; and
    the PE is low density polyethylene (LDPE).

2. The thermoplastic material according to claim 1, wherein the cross-linking agent is selected from di cumyl peroxide (DCP) and tri allylisocyanurate (TAIC).

3. The thermoplastic material according to claim 1, wherein the PE is ultra-low density polyethylene (ULDPE).

4. An electrical connector, comprising:
    an insulative, polymer connector housing defining an area containing a conductive terminal to be sealed; and
    a foamable cross-linkable thermoplastic material filling the area to be sealed, the thermoplastic material is in the form of particles, consisting of:
    a matrix polymer of polyethylene (PE) and ethylene vinyl acetate copolymer (EVA), a mixing ratio of the PE and EVA is about 1:9 to 1:1 by weight;
    a cross-linking agent selected from a peroxide cross-linking agent and an allyl cross-linking agent; and
    an organic foaming agent including azoformamide and foaming at a foaming temperature greater than 190° C., wherein:
    a weight ratio of the cross-linking agent to the matrix polymer is about 1-5:100;
    a weight ratio of the foaming agent to the matrix polymer is about 1-5:100; and
    a cross-linking foaming temperature of the thermoplastic material is equal to or higher than the melting point of the matrix polymer, the particles are formed by blending and granulating the components of the thermoplastic material at a temperature lower than the cross-linking foaming temperature.

5. The connector according to claim 4, wherein the mixing ratio of the PE and EVA is about 1:1 by weight.

6. A foamable cross-linkable thermoplastic material in the form of particles, consisting of:
    a matrix polymer of a mixture of polyethylene (PE) and ethylene vinyl acetate copolymer (EVA), a mixing ratio of the PE and EVA is about 1:9 to 9:1 by weight;

a cross-linking agent selected from a peroxide cross-linking agent and an allyl cross-linking agent; and
a foaming agent including azoformamide and foaming at a foaming temperature greater than 190° C., wherein:
a weight ratio of the cross-linking agent to the matrix polymer is about 1-5:100;
a weight ratio of the foaming agent to the matrix polymer is about 1-5:100;
a cross-linking foaming temperature of the thermoplastic material is equal to or higher than the melting point of the matrix polymer; and
the particles are formed by blending and granulating the components of the thermoplastic material at a temperature lower than the cross-linking foaming temperature.

7. The thermoplastic material according to claim 6, wherein:
the mixing ratio of the PE and EVA is about 1:1 by weight;
the PE is low density polyethylene (LDPE);
the weight ratio of the cross-linking agent to the matrix polymer is about 2:100; and
the weight ratio of the foaming agent to the matrix polymer is about 3:100.

\* \* \* \* \*